March 3, 1959 A. L. WITTEN, JR., ET AL 2,876,447
RADAR SYSTEM EVALUATOR
Filed Oct. 14, 1953 2 Sheets-Sheet 1

INVENTORS
ARTHUR L. WITTEN, JR.
JOHN F. MARION
RUDOLF E. HENNING
BY
Thomas M. Ferrill Jr.
ATTORNEY March 3, 1959
A. L. WITTEN, JR., ET AL
2,876,447
RADAR SYSTEM EVALUATOR
Filed Oct. 14, 1953
2 Sheets-Sheet 2
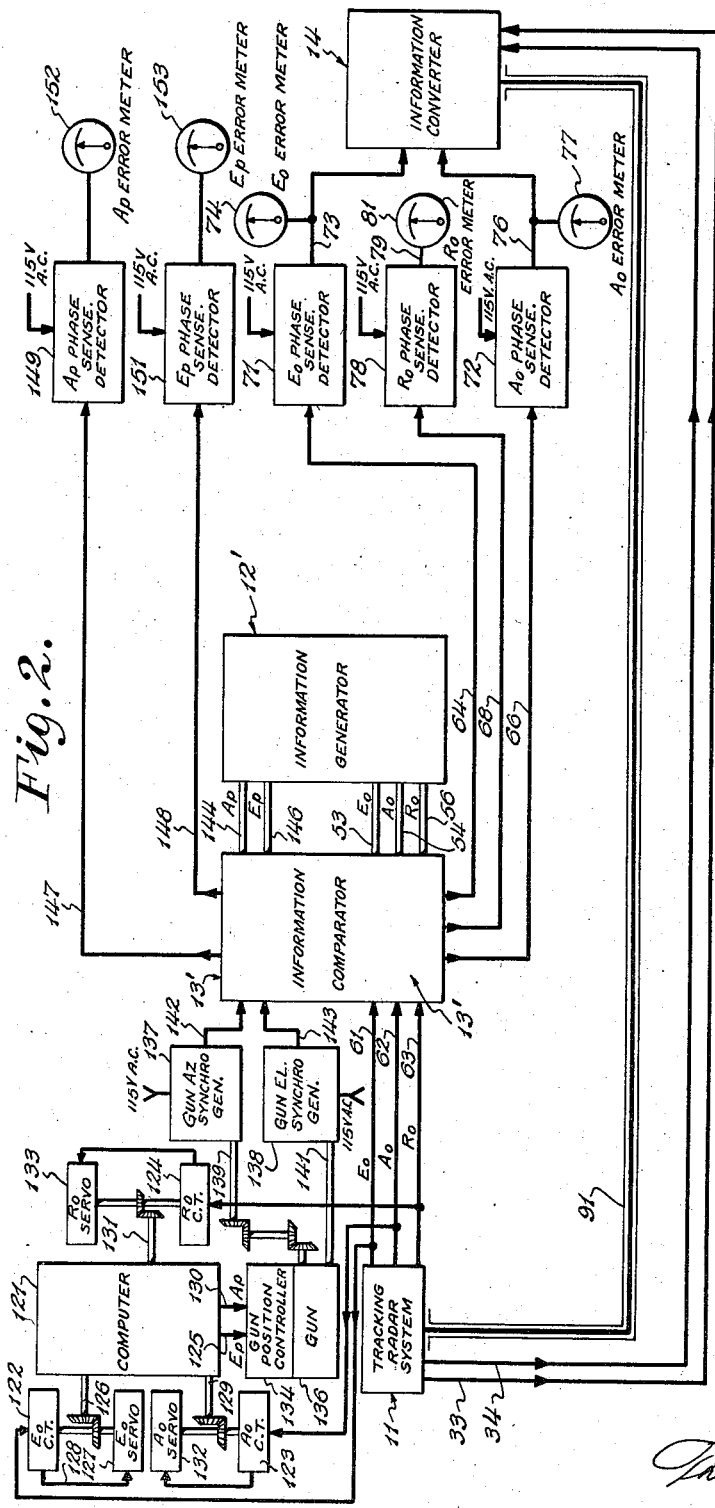
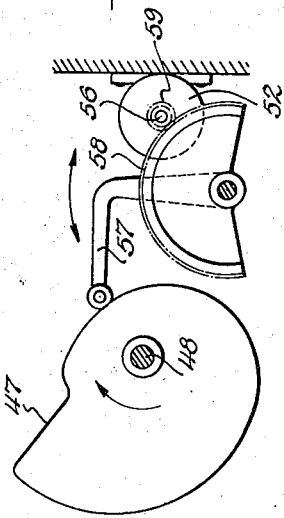
INVENTORS
ARTHUR L. WITTEN, JR.
JOHN F. MARION
RUDOLF E. HENNING
BY
ATTORNEY United States Patent Office 2,876,447
Patented Mar. 3, 1959

2,876,447

RADAR SYSTEM EVALUATOR

Arthur L. Witten, Jr., Port Washington, John F. Marion, Levittown, and Rudolf E. Henning, New York, N. Y., assignors to Sperry Rand Corporation, a corporation of Delaware Application October 14, 1953, Serial No. 386,068

17 Claims. (Cl. 343—17.7)

The present invention relates to test apparatus for evaluating the operating performance of automatic tracking radar systems.

Heretofore it has been the practice to appraise the operation of radar systems by separately and individually testing certain components therein. If particular components of a system to be tested could meet predetermined design specifications, it would be assumed that the overall system would function to produce accurate position information when employed to track a target.

An automatic tracking radar system when operating in the tracking mode comprises a complicated electromechanical servomechanism in which the radar target is a fundamental link in an overall closed servo loop. Noise, system imperfections, and residual servo errors are properties of the loop. All of these properties affect the accuracy of the target azimuth and elevation information produced by the system, with noise and system imperfections also affecting the range determining accuracy thereof.

In the absence of a target, a radar system is an open-loop servomechanism. Noise, residual servo errors and system imperfections found in closed-loop operation are not properties of the open loop. Checking components of a radar system individually as has been heretofore done in the prior art does not take into account all of the aforementioned closed loop properties because of the absence of a target. Therefore, component testing is not necessarily conclusive that, after a radar system is tested, the system will produce completely accurate target position information when operating in the tracking mode.

Prior testing procedures usually require disconnecting cables, or making a change of switch positions in the radar system. Sometimes mistakes are made in restoring the radar system to its proper operating condition. This is especially true when numerous tests are made, and results in a useless loss of time or an inoperative radar which tested "satisfactory."

Furthermore, there are times when a radar system will operate and produce accurate range, azimuth, and elevation information even though some of the components therein may not meet predetermined design specifications. The reason for this is that errors introduced by various components of the system may compensate each other. An individual component check does not readily determine such a fact, and often results in the rejection of an otherwise satisfactory system and the requirement that faulty components be replaced or repaired to meet design specifications.

The test apparatus of the present invention is adapted to be used for making one overall evaluation of the operation of automatic tracking radar systems, particularly those of the conical-scan type. The apparatus provides a meter or other visual indication of whether or not a radar system, while operating in a tracking mode, is functioning to produce accurate range, azimuth and elevation information.

It is an object of the present invention to provide means for evaluating the operation of a radar system.

It is a further object of the present invention to provide test apparatus for readily evaluating the actual closed-loop operating performance of an automatic tracking radar system.

It is another object of the present invention to provide test apparatus capable of monitoring the errors in information produced by an automatic tracking radar system so that the general location of an improperly operating unit in the system may be ascertained.

It is a further object of the present invention to provide test apparatus for evaluating the performance of a complete fire control system comprising a tracking radar and computer, whereby the accuracy of predicted, as well as present, target position information may be ascertained.

The foregoing objects are attained by providing a radar test apparatus which will cause an automatic tracking radar system to actually track a simulated target in azimuth, elevation and range. The apparatus includes means for comparing and indicating the discrepancies between position information related to the simulated target's position as determined by the radar system, and its actual position as predetermined by the test apparatus.

In order to cause the radar system to track, the test apparatus includes information generator means for producing time-varying information relating to the simulated target's position and information comparator means for comparing this information with corresponding information from the radar system being tested. Converter means are also included for receiving transmitted pulses of microwave energy from the radar system and range information from the information generator means. Means are included in the converter means to produce microwave pulses which are delayed from the radar transmitted pulses in accordance with the range information supplied from the information generator means. The converter means also includes means for deriving modulation energy from azimuth and elevation error information produced in the comparator means, which energy is used to amplitude modulate the converter microwave pulse energy when the radar system is not properly tracking the target. This modulated energy is supplied to the radar system and causes the system to track the simulated target in a conventional manner during the test.

The operation of a complete fire control system including a computer may also be evaluated. This requires the use of the aforedescribed radar test apparatus, plus further means in the information generator for producing information related to the azimuth and elevation of the target at a time when a projectile from a gun to be fired would arrive at the target, and further means in the comparator for comparing this information with the angles of azimuth and elevation of a computer-controlled gun in the fire control system.

In the drawings,

Figure 2 is a block diagram of test apparatus for evaluating the operation of a complete fire control system including a tracking radar and computer; and Figure 3 is illustrative of a typical cam and gearing mechanism found in the information generator means for producing simulated target range information in mechanical form.

Figure 1:
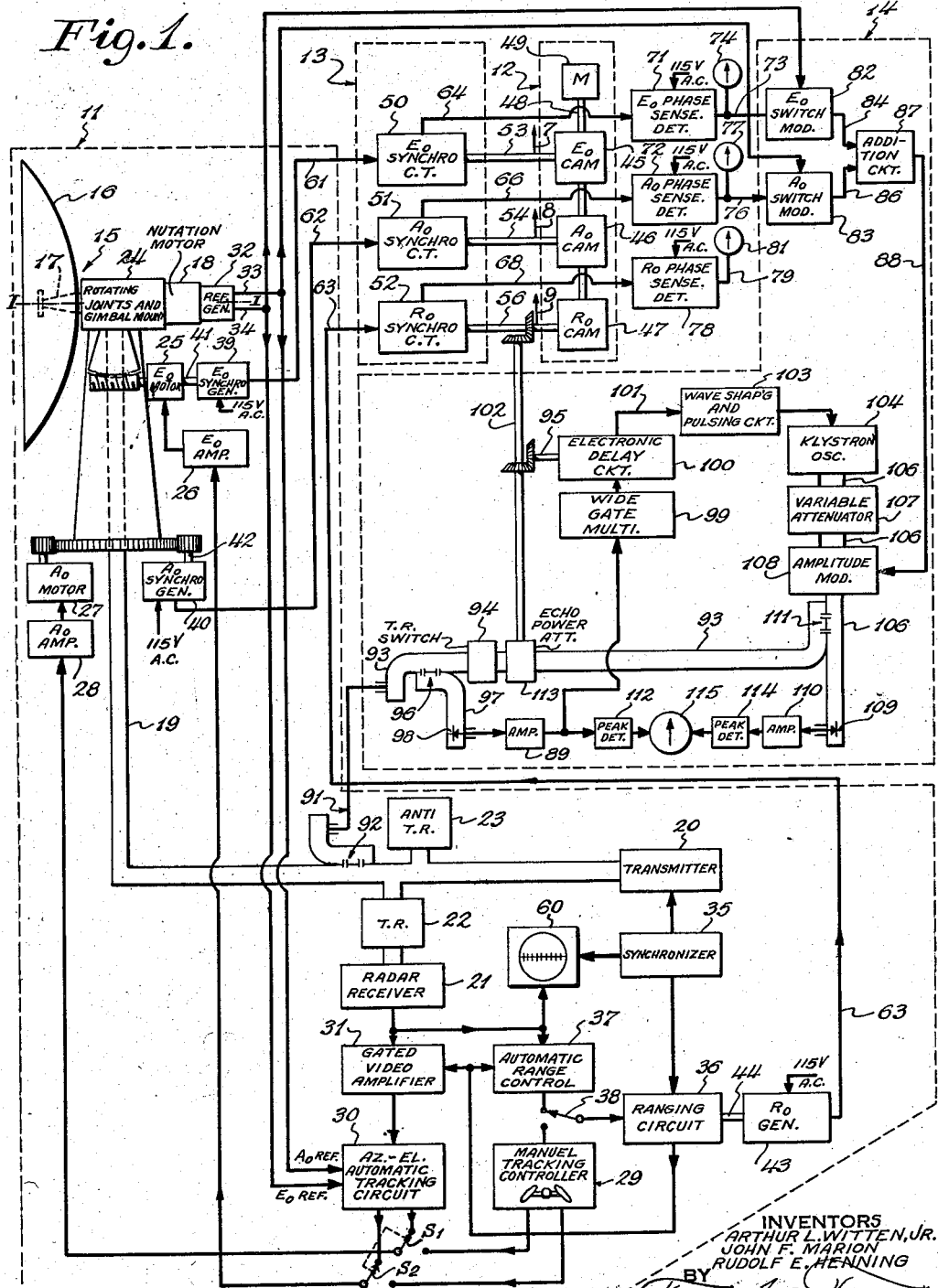
Figure 1 is a schematic diagram of the test apparatus of the present invention, and a conventional automatic tracking radar system to be tested.

Referring to Fig. 1, the elements within the dotted lines forming the block 11 comprise the automatic tracking radar system to be tested. The dotted line blocks 12, 13 and 14 of this figure comprise the radar test apparatus of the present invention, block 12 comprising the information generator means, block 13 comprising the information comparator means, and block 14 comprising the information converter means.

The automatic tracking radar system 11 is similar to the one disclosed in copending U. S. application Serial No. 313,703, filed October 8, 1952 in the name of Walter R. Tower, and assigned to the same assignee as the present application. This system includes a scanner assembly 15 comprising a paraboloidal reflector 16 and a wave guide antenna feed 17. Antenna feed 17 has an open end which is disposed approximately at the focus of the reflector 16. This open end is spaced a short distance to one side of the axis I—I of the reflector 16. Antenna feed 17 is illustrated in Fig. 1 at a ninety or two-hundred seventy degree position about the axis I—I. During the automatic tracking mode of operation the antenna feed 17 is rotated about the axis I—I of reflector 16 by means of a conventional nutator drive motor 18 mounted on the scanner assembly 15. During the aforementioned rotation the center of the end of wave guide feed 17 describes a circle about the axis of reflector 16 for producing a conical scan beam during radar transmission.

Wave guide 19 is provided to couple the antenna feed 17 to a radar transmitter 20 and receiver 21. Transmitter 20 is adapted to produce high powered radar energy comprising a series of recurrent pulses of microwave energy at a predetermined repetition rate. A conventional transmit-receive switch 22 is provided between wave guide 19 and receiver 21 for preventing the aforementioned high powered transmitted energy from reaching and damaging receiver 21. An anti-transmit-receive switch 23 is provided along wave guide 19 between transmitter 20 and the coupling junction for receiver 21 to block received echo energy from transmitter 20 and to insure that a maximum amount of echo energy is returned to receiver 21.

Suitable wave guide rotating joints schematically illustrated by block 24, are provided along wave guide 19 to permit variation of the azimuth and elevation angles of scanner 15. A gimbal mount, also schematically illustrated by block 24, is also provided to permit the wave guide antenna feed 17 to be rotated about the axis of reflector 16 as disclosed above. The aforementioned rotating joints and gimbal mount are conventional in the art and need not be specifically shown or described herein.

The angle of elevation of the axis I—I of the reflector 16 is governed by a servomotor 25, which motor is controlled by signals received from servo amplifier 26.

The azimuth of the axis I—I of reflector 16 is governed by a servomotor 27. Motor 27 is controlled by signals received from an azimuth servo amplifier 28.

Control voltages are supplied to the azimuth servo amplifier 28 and the elevation servo amplifier 26 from a manual tracking controller 29 during manual operation, or an automatic tracking circuit 30 when the radar system 11 is tracking automatically. Controller 29 and tracking circuit 30 are conventional, and comprise apparatus similar to the manual and automatic tracking apparatus disclosed in Fig. 1 of the aforementioned application No. 313,703. Ganged switches S1 and S2 are provided to change from one tracking operation to the other.

The automatic tracking circuit 30, which includes conventional azimuth and elevation phase detectors and an amplitude modulation detector as shown in Fig. 1 of the aforementioned application No. 313,703, receives amplitude modulated video pulses from a gated video amplifier 31 when the radar system 11 is tracking a target. Amplifier 31 is coupled to the radar receiver 21 for receiving video pulses therefrom.

A two phase reference generator 32 is provided on the scanner assembly 15 to supply alternating current azimuth and elevation reference voltages at outputs 33 and 34 of generator 32 to the automatic tracking circuit 30. Generator 32 is conventional and is usually mounted on the same shaft and in the same housing as the nutator motor 18.

The aforementioned reference voltages are displaced in phase from each other by ninety degrees and have frequencies equal to the frequency of rotation, in cycles per second, of the wave guide feed 17. By comparing the phase of these reference voltages with the phase of the envelope of the video pulses from amplifier 31 in a conventional manner, the tracking circuit 30 provides azimuth and elevation error voltages at its outputs to switches S1 and S2, respectively.

A synchronizer circuit 35 is coupled to the transmitter 20 and to a ranging circuit 36. This circuit 35 establishes the pulse width and repetition rate of the pulses from transmitter 20 and insures that the transmitter 20 and ranging circuit 36 are keyed in synchronism. The synchronizer circuit 35 is conventional and may be the same as the keying circuit for the radar transmitter disclosed in the aforementioned application No. 313,703.

The ranging circuit 36 comprises means for producing short, range-gating pulses which have the same repetition frequency as the pulses from transmitter 20, and which are only slightly longer than the pulses produced by transmitter 20. This circuit 36 is adjustable to delay the output gating pulses therefrom in accordance with the delay of the radar transmitted pulses to and from a selected target. Circuit 36 may be similar to the adjustable range unit and the range notch producing circuits described in the aforementioned application No. 313,703, for example.

Output pulses from circuit 36 are supplied to the video amplifier 31 to gate amplifier 31 on during the pulses from circuit 36. These gating pulses are delayed in accordance with the time it takes for the radar transmitted pulses to go and return from a selected target being tracked. The delay may be varied manually as described in the aforementioned application No. 313,703 by an adjustable voltage supplied from the manual tracking controller 29. After synchronism of the gating pulses from ranging circuit 36 with radar pulses reflected from a selected target, the delay produced by circuit 36 is automatically varied by an error voltage derived from an automatic range control circuit 37. A switch 38 is provided to change from manual to automatic operation whereby the radar system 11 will automatically track the selected target in range.

Video output pulses from the radar receiver 21 are applied to the vertical deflection plates of a cathode-ray tube of a conventional cathode-ray oscilloscope 60. The oscilloscope 60 includes a linear sweep generator coupled to the synchronizer 35 for applying a linear sweep to the horizontal deflection plates of the cathode-ray tube to establish a time base. A scale which is calibrated in range may be placed on the oscilloscope screen so that a direct reading of the range of the received video pulses may be obtained.

The automatic range control circuit 37 comprises conventional means for comparing the range gating pulses from the ranging circuit 36, and the video pulses derived from the radar receiver 21. When the gating pulses and video pulses are not synchronized, circuit 37 produces an output error voltage which is supplied through switch 38 to the adjustable ranging circuit 36. This error voltage controls the delay produced by ranging circuit 36 to bring the gating pulses from circuit 36 into coincidence with the video pulses from receiver 21.

The radar system 11 operates in a manner known in the art. The antenna feed 17 radiates the recurrent microwave pulses from the radar transmitter 20 toward the paraboloidal reflector 16, and a narrow beam is produced. When the reflector 16 is pointed in the general direction of a target to be tracked, the antenna feed 17 is rotated by motor 18 about the axis of the reflector 16 at a constant speed to produce a conical scan. The speed of rotation of antenna feed 17 may be 60 revolutions per second, for instance.

The azimuth reference voltage from the reference generator 32 is adapted to be at positive and negative peaks at 90° and 270° reference points of the conical scan, respectively, for example. Therefore, the elevation reference voltage is at positive and negative peaks at 0° and 180°, respectively, of the conical scan. If a radar target produces reflected pulses in response to the transmitted pulses, which reflected pulses are of equal intensity at the above mentioned reference points of the conical scan, the axis I—I of the reflector 16 is centered on the target. Therefore, there will be no modulation of the reflected pulses and no error voltage at the outputs of the automatic tracking circuit 30. If the axis of reflector 16 is not so centered, one complete rotation of wave guide feed 17 causes the received radar pulses to vary in amplitude from a maximum to a minimum value in a sinusoidal manner with a frequency equal to the frequency of rotation wave guide feed 17. The relative phase of this signal variation with respect to the aforementioned azimuth and elevation references voltages is indicative of the direction of the target from the axis of reflector 17, the magnitude of the variation being indicative of the distance of the target away from this axis.

The azimuth and elevation reference voltages at outputs 33 and 34 of the reference generator 32 are received by tracking circuit 30 and compared in phase with the aforementioned sinusoidal variation in pulse amplitude of the pulses from video amplifier 31. The automatic tracking circuit 30 responds to produce azimuth and elevation error control voltages which are supplied through switches S1 and S2 to amplifiers 28 and 26, respectively. The error voltages from amplifiers 28 and 26 are supplied to the motors 27 and 25, respectively, for automatically maintaining the alignment of the axis I—I of reflector 16 with the selected target in a conventional manner.

Elevation and azimuth synchro generators 39 and 40 are provided with the radar system 11. The rotors 41 and 42 of generators 39 and 40 are coupled to the elevation and azimuth gears of the radar scanner assembly 15, respectively. The rotor windings of generators 39 and 40 are connected to 115 volt alternating current sources as illustrated. These voltages are in phase with each other and have a frequency equal to 60 cycles per second, for instance. The voltages induced in the stator windings of generators 39 and 40 are proportional in phase and magnitude to the position of each of the rotors thereof. All of the synchro generators mentioned herein are similar to the one described in sec. 3—3 of the book entitled, "Theory of Servomechanisms," volume 25 of the Radiation Laboratory Series, published by the McGraw-Hill Book Company, Inc., copyright 1947.

A range synchro generator 43 is also provided, having its rotor 44 coupled to the ranging circuit 36 to be positioned in accordance with the slant range of the simulated target as determined by the phase delay produced in circuit 36. The rotor winding of generator 43 is connected to a 115 volt alternating current source which is in phase with and has a frequency equal to the frequency of the above-mentioned sources for the rotor windings of generators 39 and 40.

In order to evaluate the automatic tracking performance of the aforedescribed radar system 11, the test unit of the present invention comprising the information generator means 12, the information comparator means 13, and the information converter means 14, is coupled to the radar system 11 as illustrated.

The information generator means 12 contains time-varying information related to the angle of elevation, the angle of azimuth, and the slant range of a simulated target following a predetermined course. This information is held in mechanical form on precision-cut cams at 45, 46, and 47. These cams are coupled to and rotated by a shaft 48. Shaft 48 is driven by a constant-speed motor 49 at a slow rate of three to six revolutions per minute, for example, the cams rotating with shaft 48.

Synchro control transformers 50, 51 and 52 are provided in the information comparator means 13. These control transformers are provided with rotors 53, 54 and 56, respectively, for coupling to the cams 45, 46 and 47, respectively. Rotation of cam 45 causes rotor 53 to rotate in accordance with the time-varying angle of elevation of the simulated target, rotation of cam 46 causes rotor 54 to rotate in accordance with target azimuth, and rotation of cam 47 causes rotor 56 to rotate in accordance with target slant range. Pointers 7, 8, and 9 may be affixed to rotors 53, 54, and 56, respectively, for indicating the rotational positions of these rotors. Suitably calibrated dials, not shown, may be employed to cooperate with pointers 7, 8, and 9 to provide an indication or measure of the elevation, azimuth, and equivalent radar transmission distance of the simulated target, respectively, at any instant during the test.

In Fig. 3 a typical cam 47 and coupling arrangement is illustrated which can be employed to vary rotor 56 in accordance with variations in slant range to the simulated target. The cam 47 is coupled to the rotor 56 by means of a rocker arm 57 and gears 58 and 59. The cam 47 is rotated by shaft 48, which shaft is turned at a constant speed for a predetermined part of a cycle of revolution by motor 49 (Fig. 1). The radial displacement of any point along a predetermined portion of the peripheral edge of cam 47 from the axis of shaft 48 is designed to be a function of distance (slant range) in yards to the simulated target.

Rotation of the shaft 48 and cam 47 for a predetermined part of a revolution moves rocker arm 57. Consequently, the rotor 56 is revolved by means of gears 58 and 59 by an amount proportional to the slant range of an imaginary target following a simulated course determined by the shape of cam 47. The design of cam 47 may be such as to simulate the slant range to an aircraft following a spiral or a straight line course, for example. The shape of the illustrated cam 47 is one for an aircraft flying a straight line and level course at a constant speed, starting at a maximum slant range from the radar station, travelling past the station at a predetermined minimum slant range at crossover, and travelling away from the radar station following the same straight line course. The rocker arm 57 is illustrated as engaging the cam 47 at a position corresponding to a minimum slant range at crossover.

Cams 45 and 46 are designed on the same general principles as above to rotate shafts 53 and 54 coupled thereto by amounts and in directions proportional to the angle of elevation and the angle of azimuth of the simulated target, respectively. The simulated target's travel and the test being made by the evaluator of the present invention are completed after termination of a part of one revolution of the shaft 48 by motor 49.

The stator windings of the synchro control transformers 50, 51 and 52 of the information comparator means 13 are coupled as indicated by the coupling lines 61, 62 and 63 to corresponding stator windings of the elevation, azimuth, and range synchro generators 39, 40 and 43 of the radar system, respectively. These couplings 61, 62 and 63 are provided so that the comparator means 13 will receive alternating current voltages which are functions of the angles of elevation and azimuth of the axis I—I of the reflector 16, and the slant range to the simulated target as determined by the radar system 11, respectively. The control transformers are similar to the control transformer described in sec. 3.5 of the book, "Theory of Servomechanisms" mentioned above, and operate with the synchro generators 39, 40 and 43 in the manner described in sec. 3.5.

The alternating current voltages induced in the rotor windings of control transformers 50 and 51 are derived at outputs 64 and 66, respectively. These voltages are proportional in magnitude and phase to the difference between the instantaneous angles of azimuth and elevation of the simulated target and the instantaneous angles of azimuth and elevation of the axis I—I of reflector 16, respectively.

The alternating current voltage induced in the rotor winding of control transformer 52 is obtained at the output 68. The magnitude and phase of the alternating current voltage at output 68 is indicative of the difference between the actual simulated target range as determined by cam 47 and the target range determined by the radar system 11 being tested. When there is no alternating voltage at output 68, the delay produced by ranging circuit 36 and, therefore, the slant range to a target as determined by radar system 11 would be the same as the slant range determined by the position of cam 47 of the information generator means 12.

The rotor voltage outputs at 64 and 66 from the rotor windings of transformers 50 and 51 are coupled to first input circuits of phase sensitive detectors 71 and 72, respectively. These detectors 71 and 72 are of the type shown and described in sec. 3–12 of the aforementioned book entitled, "Theory of Servomechanisms," for instance. Each of detectors 71 and 72 has a second input circuit which is supplied with 115 volt alternating current voltages as shown. These alternating current voltages have the same frequency and phase as the voltages supplied to the rotor windings of the previously described synchro generators 39 and 40.

Detector 71 produces a direct current error signal voltage at output 73. The magnitude of the voltage at 73 is proportional to the difference between the angle of elevation of the axis of the reflector 16 and the actual angle of elevation of the simulated target as determined by cam 45. This error signal is measured and indicated by an elevation error meter 74, which comprises a conventional direct current voltmeter and indicator, for instance.

Detector 72 produces a direct current error signal voltage at output 76. The magnitude of the voltage at 76 is proportional to the magnitude of the alternating current error voltage at the output 66 of control transformer 51, with the sign (polarity) thereof depending on the phase of the alternating current error voltage. This direct current voltage is therefore indicative of the difference between the azimuth angle of the axis of the reflector 16 and the actual azimuth angle of the simulated target as determined by cam 46. The error is measured and indicated by a conventional direct current error meter 77.

The rotor winding output 68 of the range synchro control transformer 52 is coupled to a first input circuit of a phase sensitive detector 78. Detector 78 is similar to the detectors 71 and 72 described above, and produces a direct current output error signal voltage at output 79. The voltage at output 79 is measured and indicated by a meter 81 to provide an indication of the difference between the range of the simulated target determined by the radar system 11 and the actual range determined by the range cam 47.

The direct current output voltages at outputs 73 and 76 of the phase-sensitive detectors 71 and 72 are supplied to first input circuits of elevation and azimuth switch modulators 82 and 83, respectively. The modulators 82 and 83 have second input circuits which receive the elevation and azimuth alternating current reference voltages from the outputs 34 and 33 of the radar system's two-phase reference generator 32, respectively.

Modulators 82 and 83 are preferably of the "bridge" or "ring" type shown in Fig. 11–20(a) and described on pages 409 and 410 of the book entitled, "Waveforms," volume 19 of the Radiation Laboratory Series, published by the McGraw-Hill Book Company, Inc., copyright 1949.

Modulators 82 and 83 are adapted to produce modulated alternating current output voltages at 84 and 86 having frequencies corresponding to the frequency of rotation of wave guide feed 17. The amplitudes of the output voltages at 84 and 86 are proportional to the magnitude of the direct current error voltages supplied to modulators 82 and 83 by the phase-sensitive detectors 71 and 72, respectively. A reversal in polarity of either of the direct current error voltages results in a corresponding reversal in polarity of the alternating current output voltage modulated thereby. The output voltages at 84 and 86 are combined in a conventional alternating current addition circuit 87 to produce a single alternating current voltage at output 88. The magnitude and phase of the voltage at output 88 of the addition circuit 87 is proportional to the differences between the angles of azimuth and elevation of the axis I—I of the reflector 16 and the actual instantaneous angles of azimuth and elevation of the simulated target. This alternating voltage at output 88 is, therefore, proportional to the azimuth and elevation errors of scanner 15 during tracking of the simulated target.

When there is no error voltage at the output 88 of the addition circuit 87, the axis I—I of the reflector 16 would be perfectly aligned with the target. When there is an error voltage at output 88 which is in phase (or 180 degrees out of phase) with the elevation reference voltage produced by reference generator 32, for instance, it will be 90 degrees out of phase with the azimuth reference voltage. Therefore, there would be no error in azimuth of the axis of reflector 16 relative to the target, but there would be an error in the angle of elevation.

When the error voltage at output 88 of addition circuit 87 is in phase (or 180 degrees out of phase) with the azimuth reference voltage, it will be 90 degrees out of phase with the elevation reference voltage. Therefore, there would be no error in the angle of elevation of the axis of reflector 16 relative to the target, but there would be an error in azimuth. For other relative phases, an error voltage at output 88 would represent both azimuth and elevation errors, the phase thereof being indicative of the direction of the target from the axis of the reflector 16 and the magnitude of the voltage being indicative of the distance of the target away from this axis.

The information converter means 14 of the radar test apparatus is also coupled to the radar system 11 by a transmission line 91. A directional coupler 92 is provided along the primary wave guide 19 of the radar system 11 for sampling the microwave pulse energy from transmitter 20, and supplying the sampled energy via transmission line 91 to a primary wave guide 93 in the information convertor means 14.

Wave guide 93 includes a conventional microwave transmit-receive switch at 94 for keeping the aforementioned sampled transmitter energy from travelling beyond this point.

A directional coupler 96 is provided along primary wave guide 93 to couple the sampled transmitter energy to the secondary wave guide 97. Wave guide 97 is terminated in its characteristic impedance by a square-law crystal detector 98 for converting each pulse of microwave energy into a direct current pulse. A pulse amplifier 89 is coupled to detector 98 to amplify the direct current pulses therefrom.

A conventional wide gate multivibrator 99 is provided to receive the pulses from amplifier 89, multivibrator 99 generating a negative gate in response to each amplified pulse. Each negative gate produced by multivibrator 99 lasts for an appreciable part of the time between the pulses received from amplifier 89. An electronic delay circuit 100 is coupled to multivibrator 99 to receive the gating pulses.

The multivibrator 99 and the electronic delay circuit 100 comprise substantially the same circuits shown in Fig. 6–8, and described in sec. 6.2 of the book entitled, "Electronic Time Measurements," volume 20, M. I. T.

Radiation Laboratory Series, published by the McGraw-Hill Book Company, Inc., copyright 1949. These circuits 99 and 100 operate to produce an output at 101 which comprises a series of recurrent time-modulated pulses. These pulses are delayed in time by an amount proportional to the time it would take for the radar pulses to go and return from the simulated target.

The delay of the pulses at the output 101 is determined by adjusting the phase delaying elements of circuit 100 in the manner set forth in the description of Figs. 6.12 and 6.14 in the aforementioned book entitled, "Electronic Time Measurements." This delay can be effected automatically by coupling the mechanically controlled phase-delaying elements therein (see Fig. 6.8 of the aforementioned book entitled, "Electronic Time Measurements") to a rotor 95 geared to a shaft 102. Shaft 102 is coupled to the range simulating cam 46 in the manner shown to automatically supply predetermined time-varying simulated target range information to the electronic delay circuit 100.

The time-modulated pulses at output 101 from the delay circuit 100 comprise a series of delayed short positive pulses recurring at the repetition rate of the pulses from transmitter 20. These positive pulses are supplied to a conventional wave-shaping and pulsing circuit 103 for producing negative pulses of suitable width and amplitude for pulsing the cathode of a klystron oscillator 104. Suitable apparatus for the circuit 103 is shown in Fig. 5.2 of chapter 5, of the aforementioned book entitled, "Waveforms."

Klystron oscillator 104 is adapted to produce output pulses of microwave energy in response to the pulses at its cathode. The output pulses from oscillator 104 are therefore delayed from the pulses of the radar transmitter 20 by an amount corresponding to the time it would take for the radar pulses to go and return from the simulated target.

The klystron oscillator 104 is of the thermally-tuned type and is similar, for example, to the 2K45 klystron described on pages 513–515 of the book entitled "Klystrons and Microwave Triodes," volume VII of the aforementioned Radiation Laboratory Series, published by the McGraw-Hill Book Company, Copyright 1948. Klystron 104 is adapted to produce output pulses having a microwave carrier frequency substantially equal to the carrier frequency of the pulses produced by the radar transmitter 20 of the radar system being tested. The repetition rate of the pulses from klystron 104 will be the same as the repetition rate of the time-modulated pulses from the electronic delay circuit 100.

The microwave frequency of the klystron oscillator 104 can be adjusted manually in any conventional manner to be substantially equal to the carrier frequency of the pulses from the radar transmitter 20. If desired, an automatic frequency control circuit may be employed to perform this function. Suitable circuits for automatic frequency control which have been successfully employed with the apparatus of the present invention are shown and described in copending U. S. patent application Serial No. 301,710, filed on July 30, 1952 in the name of John F. Marion, and assigned to the same assignee as the present application, now U. S. Patent No. 2,765,460, issued October 2, 1956.

A wave guide 106 is coupled to the output of the klystron oscillator 104. Wave guide 106 includes a variable attenuator at 107, an amplitude modulator at 108, and a square-law crystal detector 109 terminating the end of wave guide 106 in its characteristic impedance.

Variable attenuator 107 is conventional and may be of the movable vane type shown in U. S. Patent No. 2,630,492, patented March 3, 1953, for example. Attenuator 107 is provided so that the klystron echo pulse power supplied to the radar receiver 21 from the test apparatus can be readily adjustable so that the peak power of the echo pulses will be equal to what the peak power of the radar pulses from transmitter 20 would be after reflection of such radar pulses from a conventional target having a predetermined radar-cross-section, neglecting range to the target.

To insure that the return echo pulse power is at the proper power level, the square-law crystal detector 109 is provided at the end of wave guide 106. The output from detector 109 is supplied to a conventional pulse amplifier 110 which is identical to the pulse amplifier 89. The outputs from amplifier 89 and amplifier 110 are supplied to peak detector 112 and peak detector 114, respectively. Detectors 112 and 114 are each similar to the precision peak detector shown in Fig. 14.6(a), page 506 of the aforementioned book entitled, "Waveforms." Since detector 98 is operating as a square-law detector, the output from detector 112 is proportional to the peak power of the pulses from radar transmitter 20. Likewise, the output from detector 114 is proportional to the peak power of the pulses from klystron oscillator 104.

The outputs from the peak detectors 112 and 114 are supplied to opposite sides of a conventional zero-center reading type meter 115. The crystal detectors 98 and 109 are so arranged in the system, and attenuator 107 so adjusted that the pulses incident upon detectors 98 and 109 from transmitter 20 and oscillator 104, respectively, are attenuated by amounts which cause the same pulse power to be received by the detectors 98 and 109 when the test apparatus delivers the correct power to receiver 21 to simulate the return signal to the radar system 11 from a target having a predetermined mean radar cross section. When this condition obtains, the meter 115 will give a "null" reading. Attenuator 107 is adjustable to readily obtain the aforementioned "null" reading on meter 115.

The modulator unit 108 comprises means for varying the amplitudes of the microwave pulses from oscillator 104 in accordance with the alternating current error voltage at the output 88 of addition circuit 87. In order to obtain a high percentage modulation, a wave guide unit employing a ferrite cylinder electromagnetic wave rotator has been successfully employed. A typical modulator unit, for example, may be similar to the structure described on pages 16–19 and shown in Fig. 6 of the January 1952 issue of "The Bell System Technical Journal," vol. XXXI, No. 1.

A predetermined magnetic field produced by the winding shown in Fig. 6 on page 18 of the aforementioned Bell System publication is applied to the ferrite cylinder to produce a predetermined degree of rotation of the electromagnetic waves in the circular wave guide shown in the article. The rotation is such that only a predetermined part of the energy supplied to the input rectangular wave guide will be propagated in the output rectangular wave guide, which output wave guide is rotated by ninety degrees with respect to the input guide, for example. Therefore, if modulator 108 of the present application is similar to the aforedescribed structure, it will inherently provide a predetermined "mean" attenuation of the waves supplied to it by the section of input wave guide 106 and propagated in the section of output wave guide 106 coupled thereto. The input and output sections of wave guide 106 coupled to modulator 108 are orientated along a common axis to have their cross sections at an ninety degree angle with respect to each other, as in the aforementioned article.

The output 88 of addition circuit 87 is coupled, for example, to the winding for producing the magnetic field applied to the ferrite cylinder for producing the predetermined rotation of the electromagnetic waves. If there is an error voltage at output 88, the magnetic field applied to the ferrite cylinder will be varied accordingly, the degree of rotation of the waves in the circular wave guide section will change and the attenuation of the waves through the modulator unit 108 will vary about the aforementioned "mean" value of attenuation. Although such a modulator unit has been found to be desirable, other well known types of wave guide modulators known in the art may also be suitable.

A directional coupler 111 is provided to sample the output from modulator 108 for transmission of the pulses of microwave energy therefrom to the radar system 11 via wave guide 93 and transmission line 91. A variable wave guide attenuator 113 is provided in wave guide 93 to simulate the variation of echo power with range. The attenuator 113 may be similar to the one at 107, and is ganged to the range control shaft 102 by a cam arrangement, not shown, so that, as shaft 102 is rotated, the simulated echo power will approximately follow the 4th-power law of echo energy attenuation with range.

The microwave pulse energy at the output of variable attenuator 113 is sufficiently low in power to be propagated past the transmit-receive switch 94. This energy is supplied to the radar receiver 21 of the radar system 11 via transmission line 91, directional coupler 92 and transmit-receive switch 22, and comprises simulated echo pulse energy containing information relating to the position of the simulated target in azimuth, elevation, and range.

In order to evaluate the tracking performance of the radar system 11 in accordance with the present invention, the reflector 16 of the scanner assembly 15 is initially adjusted so that the axis I—I thereof has approximately the same angles of azimuth and elevation as the corresponding angles of the simulated target as determined by the initial position of cams 46 and 45. Switches S1 and S2 are closed for manual control of the position of the scanner assembly 15 during this adjustment. Likewise, switch 38 is closed for manual control to adjust the delay provided by ranging circuit 36 so that the gating pulses from circuit 36 will be coincident with pulses generated in the test apparatus which are received by the radar system 11 and which simulate pulses from a target located at a range determined by the initial position of cam 47.

After the aforementioned initial adjusting procedure, the switches S1, S2 and 38 are closed for automatic tracking, and the radar system 11 and the information generator means 12 are simultaneously energized for operation. As the simulated target travels along its predetermined course the cams 45, 46 and 47 supply present elevation ($E_o$), present azimuth ($A_o$) and present range ($R_o$) target position information to the synchro control transformers 50, 51 and 52, respectively. These control transformers also receive present elevation ($E_o$), present azimuth ($A_o$) and present range ($R_o$) position information from the elevation synchro generator 39, the azimuth synchro generator 40, and the range synchro generator 43 of the radar system 11, respectively.

Alternating current error voltages at outputs 64, 66 and 68 of the synchro control transformers 50, 51 and 52 are supplied to the phase sensitive detectors 71, 72 and 78, respectively, for conversion to direct current error information signals as was described above. The magnitudes and polarities of the signals are measured and indicated by meters 74, 77 and 81 to provide an indication of the tracking performance of radar system 11.

The meters 74, 77 and 81 will give a continuous indication of the tracking performance during the test and an operator can readily ascertain whether or not the radar system 11 is functioning properly to supply azimuth, elevation, or range information. If any one of the meters 74, 77 and 81 indicates an error greater than some predetermined maximum, it is immediately known that the radar system is faulty in some part of the particular tracking circuit involved. If none of the meters 74, 77 and 81 show intolerable errors during the test, the tracking performance of the radar system tested is satisfactory.

To evaluate the operation of a complete fire control system including a computer for producing predicted target information from present invention determined by a tracking radar as shown in Fig. 1, apparatus as shown in the block diagram of Fig. 2 is provided. Corresponding reference numerals for components in the system shown in Fig. 2 are used when they are identical to corresponding components of the system shown in Fig. 1. A primed reference numeral indicates that a unit in Fig. 2 is similar to a corresponding unit in Fig. 1, but includes further elements therein which will be described.

Referring to Fig. 2, present elevation ($E_o$), present azimuth ($A_o$), and present range ($R_o$) synchro generator voltage information signals provided by the radar system 11 at the stator windings of generators 39, 40 and 43 (Fig. 1), respectively, are supplied to a computer 121 (Fig. 2). The radar system 11 is caused to track a simulated target and provide these information signals in the manner described above. Computer 121 is provided with an elevation control transformer 122, an azimuth control transformer 123, and a range control transformer 124 to receive the aforementioned ($E_o$), ($A_o$), and ($R_o$) information signals, respectively.

The rotor of elevation control transformer 122 is coupled to an elevation input data shaft 126 of the computer 121 and to the shaft of a servomotor 127. The position of shaft 126 represents the present angle of elevation ($E_o$) of the axis I—I of the scanner 15 in radar system 11. Any change in the present elevation voltage ($E_o$) supplied to the stator windings of elevation control transformer 122 will cause an error voltage to be generated in the rotor winding thereof. This error voltage is supplied to the servomotor 127 by coupling 128 and causes the shaft of servomotor 127 to change its position. A change in the position of the shaft of motor 127 drives the rotor of control transformer 122 until there is no error voltage at coupling 128, and the position of the computer input data shaft 126 is again representative of the angle of elevation of the axis of reflector 16.

The rotors of the azimuth and range control transformers 123 and 124 are coupled to azimuth and range input data shafts 129 and 131 of the computer, respectively. Azimuth servomotor 132 and range servomotor 133 are also provided, and have their rotor shafts coupled to the rotors of transformers 123 and 124, respectively. A change in the azimuth and range synchro generator voltages from the radar system 11 will cause the azimuth and range servomotors 132 and 133 to drive the computer azimuth and range data shafts 129 and 131, respectively, in the conventional manner described above.

The computer 121 receives the present elevation ($E_o$), present azimuth ($A_o$), and present range ($R_o$) radar information and converts it into predicted elevation ($E_p$) and azimuth ($A_p$) information relating to the position of the simulated target at a time when a projectile from a gun to be fired would arrive at the target. This predicted information, which is provided in synchro generator voltage form at the outputs 125 and 130 of the computer 121, is supplied to a gun position controller indicated at block 134. The gun position controller may comprise any suitable servo means known in the art, and governs the azimuth and elevation of a gun (indicated in block form at 136) in accordance with the aforementioned predicted information.

Azimuth and elevation synchro generators 137 and 138 are provided with rotors 139 and 141 thereof coupled to the gun 136 to receive the gun azimuth and gun elevation information. The voltage at the stator output 142 of generator 137 represents the gun position in azimuth, and the voltage at the stator output 143 of generator 138 represents the gun position in elevation.

The information generator means 12' of Fig. 2 includes the motor and cam elements shown in Fig. 1 plus further cam elements (not shown) for supplying information relating to the predicted angles of azimuth ($A_p$) and elevation ($E_p$) of the simulated target, respectively. This predicted information relates to the position of the simulated target at a time when a projectile from the gun 136 would arrive thereat if it were a real target. This predicted information is supplied to an information comparator means 13' via rotors 144 and 146. The information comparator means 13' also receives the azimuth and elevation gun position synchro generator voltages from the stator outputs 142 and 143 of generators 137 and 138, respectively.

The comparator means 13' comprises the synchro control transformers shown in Fig. 1, plus further elevation and azimuth control transformers (not shown) for receiving and comparing the voltages at 142 and 143 with the positions of the rotors 144 and 146, respectively. Alternating current voltages at outputs 147 and 148 are proportional to the differences between the actual angles of azimuth and elevation of the gun 136 and the predicted angles (relating to what these angles should be) from the information generator means 12', respectively.

The error voltages at outputs 147 and 148 are supplied to phase sensitive detectors 149 and 151, respectively. Phase detectors 149 and 151 are of the same type as has been described before and are coupled to direct current error meters 152 and 153 to measure and indicate the differences between the azimuth and elevation angles of the simulated target at its predicted position as determined by the information generator means 14' and the actual azimuth and elevation angles of the gun at 136, respectively. Therefore, the five error meters 152, 153, 74, 81 and 77 will provide an indication of the gun azimuth error, the gun elevation error, the elevation and azimuth errors of the radar scanner 15, and the error in slant range to the simulated target as determined by the radar system 11.

Since many changes could be made in the arrangement and components of the aforedescribed test apparatus without departing from the scope of the present invention, it is intended that all matter contained in the above description or shown in the accompanying drawings shall be interpreted as illustrative and not in a limiting sense.

What is claimed is:

1. A radar system evaluator, comprising means for producing information relating to the position of a simulated target, information comparator means having first input means coupled to said information producing means for receiving said information therefrom, said comparator means having second input means for receiving simulated target position information determined by a radar system to be tested, said comparator means comprising apparatus for comparing the information at said first and second input means thereof and producing output error information relating to differences between the information at said first and second input means, means coupled to said comparator means for producing radar system modulation error intelligence in response to at least part of said error information, and means for supplying microwave energy to the radar system to be tested, said last-named means including means coupled to said error intelligence producing means for modulating said microwave energy in accordance with said error intelligence to provide simulated echo energy containing automatic tracking intelligence for the radar system to be tested.

2. A radar system evaluator as set forth in claim 1, wherein said information comparator means comprises a plurality of synchro control transformers for receiving and comparing the information from the information producing means and the radar system to be tested.

3. A radar system evaluator as set forth in claim 2, wherein said information producing means includes means for producing predetermined azimuth and elevation position information relating to the azimuth and elevation angles of the simulated target, and wherein one of said plurality of control transformers receives the azimuth position information and another of said plurality of control transformers receives the elevation position information, respectively.

4. A radar system evaluator as set forth in claim 3, wherein said information producing means includes mechanical means for storing and generating said simulated target azimuth and elevation position information in mechanical form, rotor shafts of said one and another synchro control transformers comprising the first input means of said information comparator means, said rotor shafts being coupled to said mechanical means for rotation in accordance with the angles of azimuth and elevation of the simulated target, respectively.

5. A radar system evaluator as set forth in claim 1, wherein said means for supplying microwave energy includes a microwave oscillator, and keying means coupled to said oscillator for initiating the production of said echo energy in response to keying energy from the radar system to be tested.

6. Test apparatus for evaluating the tracking accuracy of an automatic tracking radar system, comprising information generator means for producing time-varying output information related to the azimuth and elevation angles of a simulated target following a predetermined course, information comparator means having first input means coupled to said information generator means and responsive to the azimuth and elevation information therefrom, said comparator means having second input means responsive to information related to the azimuth and elevation angles of a radar scanner of a tracking radar system to be tested, said comparator means comprising means for producing output azimuth error information proportional to the discrepancy between the azimuth information at said first and second input means and output elevation error information proportional to the discrepancy between the elevation information at said first and second input means, means for receiving said azimuth and elevation error information from said comparator means and producing a modulation signal therefrom, means for supplying microwave energy to the radar system to be tested, said last-named means including modulating means coupled to said modulation signal producing means for receiving said modulation signal and modulating said microwave energy with intelligence detectable by the radar system to be tested for tracking the simulated target.

7. Test apparatus as defined in claim 6, wherein said information comparator means includes first and second synchro control transformers for receiving said azimuth and elevation information, respectively, and wherein said microwave energy supplying means includes a microwave oscillator.

8. Test apparatus as defined in claim 7, wherein said information generator means comprises apparatus for producing time-varying mechanical output information, and wherein said first and second synchro control transformers include rotor shafts comprising the first input means of said comparator means for receiving said mechanical output information.

9. Test apparatus as defined in claim 6, further including means for producing time-varying output information related to the range of the simulated target, and means coupled to said last-named means for delaying the microwave energy supplied to the radar system to be tested in accordance with the range of said simulated target.

10. An automatic tracking radar system evaluator, comprising an information generator for producing time-varying information relating to the angle of azimuth, the angle of elevation, and the range of a simulated target, a plurality of synchro control transformers having first input means coupled to said information generator for receiving said time-varying information, said control transformers having second input means for receiving information relating to the angle of azimuth, the angle of elevation, and the range of the simulated target as determined by the radar system to be tested, and means coupled to said synchro control transformers for producing simulated target echo energy containing azimuth, elevation, and range error intelligence for transmission to the radar system to be tested for automatically tracking the simulated target.

11. An automatic tracking radar system evaluator as defined in claim 10, and further including error meter means coupled to respective ones of said plurality of synchro control transformers for indicating the differences between the information at the first and second input means thereof.

12. An automatic tracking radar system evaluator, comprising an information generator for producing time-varying information relating to the angle of azimuth and the angle of elevation of a simulated target, information comparator means having first input means coupled to said information generator for receiving said time-varying information, said comparator means having second input means for receiving corresponding information determined by the radar system to be tested, said comparator means comprising means for producing an azimuth error alternating voltage and an elevation error alternating voltage in response to differences in azimuth and elevation information at the first and second input means thereof, azimuth and elevation phase sensitive detectors coupled to said comparator means for receiving the azimuth and elevation error alternating voltages, respectively, said phase sensitive detectors comprising means for changing said azimuth and elevation error alternating voltages into direct-current azimuth and elevation error voltages whose polarities and magnitudes are dependent on and proportional to the phases and magnitudes of said azimuth and elevation error alternating voltages, respectively, means for receiving said direct-current azimuth and elevation error voltages and transforming said voltages into an alternating voltage containing radar system azimuth and elevation error intelligence, and means for supplying simulated target echo energy to the radar system to be tested, said last-named means including modulation means coupled to said transforming means for modulating said echo energy with said azimuth and elevation error intelligence.

13. An automatic tracking radar system evaluator as defined in claim 12, wherein said transforming means includes first and second modulator circuits, said first and second modulator circuits including first input means for receiving azimuth and elevation reference alternating-current voltages from the radar system to be tested, respectively, said first and second modulator circuits further including second input means respectively coupled to said azimuth and elevation phase sensitive detectors for receiving said direct-current voltages therefrom, said first modulator circuit comprising means for producing an alternating voltage output whose magnitude and relative phase are directly proportional to the magnitude and polarity of said direct-current voltage at the said second input means thereof, said second modulator circuit comprising means for producing an alternating voltage output whose magnitude and relative phase are directly proportional to the magnitude and polarity of said direct-current voltage at the second input means thereof, and means coupled to said first and second modulator circuits for receiving the alternating voltages therefrom and combining said voltages to produce a single azimuth and elevation alternating voltage error signal containing said radar system azimuth and elevation error intelligence.

14. Test apparatus as defined in claim 13, wherein said means for supplying simulated target echo energy includes oscillator means for producing recurrent pulses of microwave energy having a predetermined carrier frequency and repetition rate which are substantially equal, respectively, to the carrier frequency and repetition rate of pulses produced by the radar system to be tested, and output wave guide means coupled to said oscillator means for transmitting the recurrent pulses therefrom to the radar system to be tested.

15. Test apparatus as defined in claim 14, wherein trigger means are coupled to said oscillator means for keying and pulsing said oscillator means in response to energy from the radar system to be tested, said trigger means including means for delaying the pulsing of said oscillator means in accordance with the range of the simulated target.

16. An evaluator for fire-control apparatus including an automatic tracking radar system and a computer coupled thereto for automatically controlling the direction of a gun to be fired at a target tracked by said radar system, said evaluator comprising an information generator including means for producing time-varying target position information relating to the present angle of azimuth, the present angle of elevation and the present range of a simulated target following a predetermined course, said information generator further including means for producing time-varying target position information relating to the predicted angles of azimuth and elevation of the simulated target at times when a projectile from the gun would arrive at the simulated target, an information comparator having first input means coupled to said information generator for receiving said time-varying present target position information and said time-varying predicted target position information, said information comparator having second input means for receiving present target azimuth and elevation angle information and present range information from the radar system and for receiving gun azimuth and elevation angle information relating to the predicted position of the simulated target, said information comparator comprising means for producing output error information related to the differences between the corresponding information at said first and second input means thereof, means coupled to said information comparator means for producing a radar system modulation error signal in response to present azimuth and present elevation error information, and means for producing microwave simulated echo energy for transmission to the radar system of the fire control apparatus to be tested, said last-named means including modulation means coupled to said modulation error signal producing means for modulating said simulated echo energy with said error signal.

17. An evaluator as set forth in claim 16, further including first error meter means coupled to said information comparator for indicating the difference between the present angle of azimuth of the simulated target as determined by the information generator and the present angle of azimuth of the simulated target as determined by the radar system, second error meter means coupled to said information comparator for indicating the difference between the present angle of elevation of the simulated target as determined by the information generator and the present angle of elevation of the simulated target as determined by the radar system, third error meter means coupled to said information comparator for indicating the difference between the predicted angle of azimuth of the simulated target as determined by the information generator and the angle of azimuth of said gun, and fourth error meter means coupled to said information comparator for indicating the difference between the predicted angle of elevation of the simulated target as determined by the information generator and the angle of elevation of said gun.

References Cited in the file of this patent
UNITED STATES PATENTS

| 2,421,016 | Deloraine | May 27, 1947 |
| 2,505,525 | Clapp | Apr. 25, 1950 |
| 2,532,539 | Counter | Dec. 5, 1950 |
| 2,691,098 | Selove | Oct. 5, 1954 |